(12) United States Patent
Hope et al.

(10) Patent No.: US 6,481,454 B2
(45) Date of Patent: Nov. 19, 2002

(54) REGULATOR WITH SEGMENTED BODY

(75) Inventors: Rodney C. Hope, Sugar Land, TX (US); Thomas W. Neugebauer, Houston, TX (US)

(73) Assignee: Gilmore Valve Co., Ltd., Houston, TX (US)

(*) Notice: Subject to any disclaimer, the term of this patent is extended or adjusted under 35 U.S.C. 154(b) by 0 days.

(21) Appl. No.: 09/933,377

(22) Filed: Aug. 20, 2001

(65) Prior Publication Data

US 2002/0023683 A1 Feb. 28, 2002

Related U.S. Application Data

(63) Continuation-in-part of application No. 09/640,401, filed on Aug. 16, 2000.

(51) Int. Cl.[7] .............................................. G05D 16/10
(52) U.S. Cl. ................................. 137/116.3; 137/115.15
(58) Field of Search ......................... 137/116.3, 115.15, 137/625.67

(56) References Cited

U.S. PATENT DOCUMENTS

| | | |
|---|---|---|
| 3,033,578 A | 5/1962 | Kellogg |
| 3,455,566 A | 7/1969 | Hull et al. |
| 3,917,220 A | 11/1975 | Gilmore |
| 4,493,335 A | 1/1985 | Watson |
| 4,506,693 A | 3/1985 | Acker |
| 4,572,518 A | 2/1986 | Spargo et al. |
| 4,586,533 A | 5/1986 | Estes |
| 4,681,327 A | 7/1987 | d'Agostino et al. |
| 5,065,666 A | * 11/1991 | Young .................. 137/625.66 |

OTHER PUBLICATIONS

54–200 Series; Regulator Hydraulic; Tescom Corporation; 4–83.

* cited by examiner

Primary Examiner—Gerald A. Michalsky
(74) Attorney, Agent, or Firm—Blackwell Sanders Peper Martin LLP

(57) ABSTRACT

The regulator connects to a high pressure fluid supply and regulates the pressure to a downstream apparatus. If an over-pressure occurs, it is vented to atmosphere. A segmented body reduces production costs. An elongate control stem engages a supply seal assembly and a vent seal assembly and moves axially with respect to these seal assemblies to achieve regulation and venting. Both the supply seal assembly and the vent seal assembly are bi-directional and operate when forces are applied from opposing directions.

7 Claims, 9 Drawing Sheets

REGULATOR WITH SEGMENTED BODY

CROSS REFERENCED TO RELATED APPLICATION

This is a continuation-in-part of U.S. patent application Ser. No 09/640,401 filed on Aug. 16, 2000 for a Precision Regulator, which application is now pending.

BACKGROUND OF THE INVENTION

1. Field of the Invention

The present invention is a regulator used for controlling fluid pressures in a downstream apparatus. The regulator can also vent excess downstream pressures to atmosphere. The body is segmented into at least three interconnected parts. In addition, a bi-directional seal design is used in conjunction with a sliding control stem.

2. Description of Related Art

Gilmore Valve Company, the assignee of the present invention, has sold shear valves and other types of regulators for many years. Examples of these prior art devices are shown in U.S. Pat. Nos. 3,917,220 and 4,493,335, both of which are included in the Information Disclosure Statement filed concurrently herewith. In order to adjust the set point for these prior art regulators, the operator was required to turn a large handle at the top of the apparatus which would compress springs on the inside of the apparatus. This was sometimes difficult at higher set points. Some prior art designs also had problems with dead bands.

Dead band is a generic term used to describe the envelope of performance when a regulator will not respond to pressure fluctuation. There are several types of dead band including forward adjustment dead band, reverse adjustment dead band, droop dead band and accumulation dead band. Generally, larger dead bands are less desirable because they degrade the sensitivity of the regulator. Smaller dead bands can also negatively affect durability. Smaller dead bands can result in chatter and/or instability under uncertain flow conditions. There is a need for a design that optimizes the dead band characteristics of a regulator to achieve a balance between sensitivity, stability and durability.

It is known in the prior art to use dual seals in conjunction with each other in order to multiply the sealing force being exerted by one of the seals. For example, in U.S. Pat. No. 3,455,566, a circular o-ring is described as a unit force multiplying seal that exerts pressure on a controlling seal that has a triangular cross section. Under compression, the shape of the circular o-ring is distorted and additional force is transferred to the second seal. However, this prior art design only works when pressure is applied from a specific direction. There is a need for an improved dual seal arrangement so that the second seal will function regardless of the direction of pressure that is being applied to the other seal.

BRIEF SUMMARY OF THE INVENTION

Prior art regulators are often difficult to adjust accurately at higher pressures, because the adjustment knob must push against the full force of a spring on the inside of the apparatus. In the present invention, the adjustment knob moves internal mechanisms including a small diameter control stem, not the spring.

Rotation of the adjustment knob of the present invention only requires minimum force. The higher forces and torques of prior art regulators tended to wear out the threads in the adjustment mechanism. The lower forces in the present invention minimize this wear.

Strong individuals are sometimes known to turn adjustment knobs too hard and strip the threads or ruin prior art regulators. A common solution to this problem in prior art devices is anti-rotation pins. The present invention does not have anti-rotation pins and is believed to have a unique solution to the problem of excess torque. If the adjustment knob on the present invention is turned beyond full open or full close, it merely causes the internal mechanisms including the control stem to rotate, rather than strip threads or break.

The body of the present regulator includes at least three interconnected segments. This segmented body design reduces inventory carrying costs. When an order is received, final machining of port size and type can be done for each segment. These segments are then assembled with elongate bolts to define the interconnected body. Thus the number of components required for inventory can be held to a minimum.

The present regulator has improved dead band response. If the set pressure of a regulator is adjusted upward from the forward adjustment set point, until the regulator just starts to supply, then the forward adjustment dead band (sensitivity) is the amount that the pressure increases until it stabilizes. Some prior art regulators including the Gilmore 44577 and other competitive regulators had a forward adjustment dead band in excess of 200 psi. If the set pressure of a regulator is adjusted downward from the reverse adjustment set point, until the regulator just starts to vent, then the reverse adjustment dead band (sensitivity) is the amount that the pressure decreases until it stabilizes. Some prior art regulators including the Gilmore 44577 and other competitive regulators had a reverse adjustment set point in excess of 200 psi. The present invention has less than a 50 psi forward and reverse adjustment dead band.

Droop dead band is the number of psi that the down stream pressure falls below the forward adjustment set point before the regulator starts to supply fluid. Some prior art regulators, including the Gilmore 44577 and other competitive regulators, had droop dead bands in the neighborhood of 20% of the set pressure. The present invention droop dead band is approximately 125 psi, even up to a 9000 psi set pressure.

Accumulation dead band is the number of psi that the downstream pressure increases above the forward adjustment set point before the regulator starts to vent fluid. Some prior art regulators, including the Gilmore 44577 and other competitive regulators, sometimes had accumulation dead band in the neighborhood of 20% of the set pressure. The present invention accumulation dead band is nearer to 6%.

The seal assembly in the present invention is a bi-directional pressure energized design that allows for lower friction between the control stem and the seals. The seal assembly includes both an o-ring and a seal ring. The o-ring energizes and increases the force against the seal ring which seals against the control stem.

BRIEF DESCRIPTION OF THE DRAWINGS

FIG. 3 shows the three segments of the body interconnected by elongate bolts.

DETAILED DESCRIPTION OF THE INVENTION

Figures 1, 2:
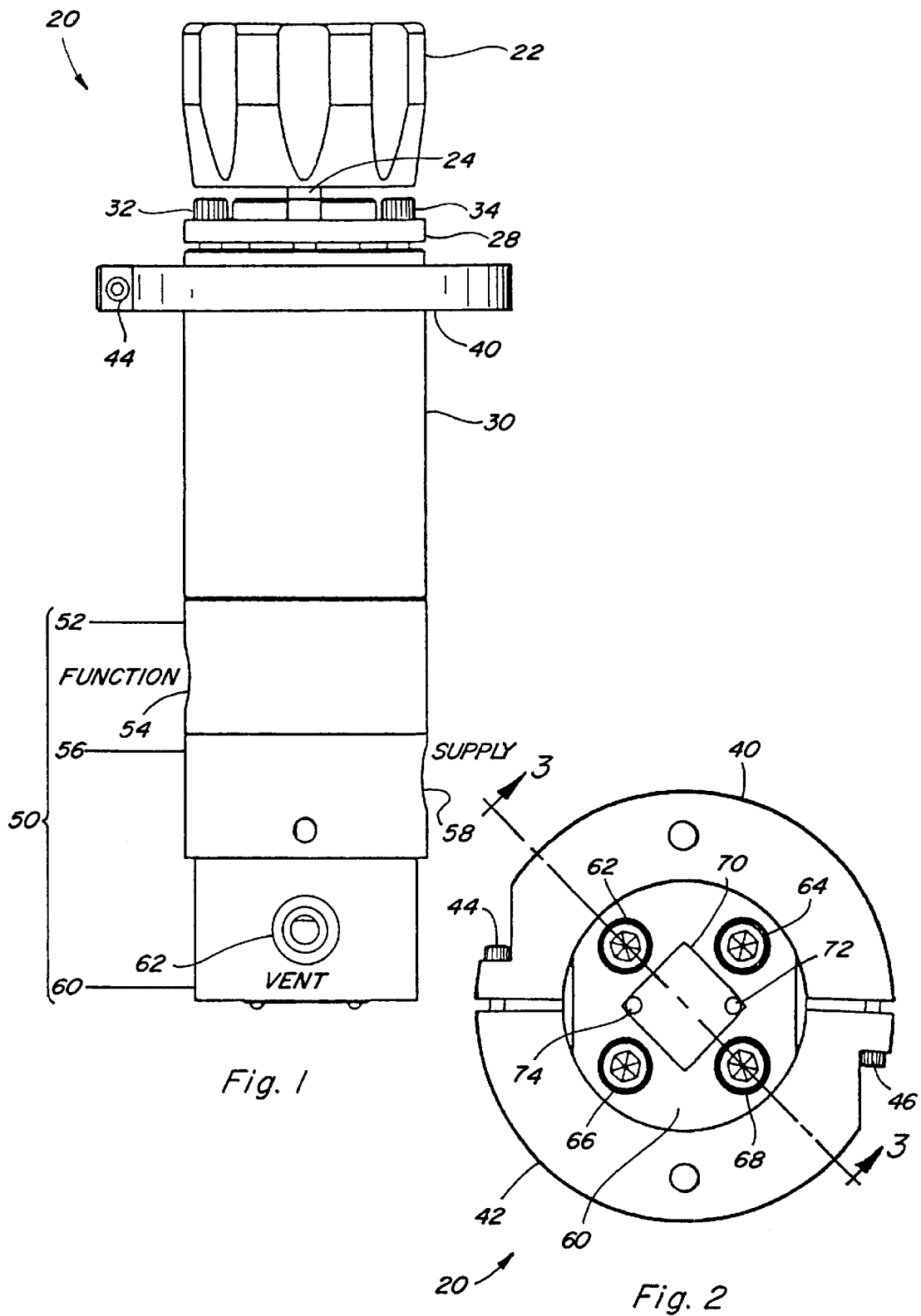
FIG. 1 is a side elevation view of the regulator with the vent port facing outward.
FIG. 2 is a bottom view of the regulator of FIG. 1.

FIG. 1 is a side elevation view of the regulator with segmented body generally identified by the numeral 20. A adjustment knob 22 is secured to the adjustment stem 24 by jam nut 26, not shown in this figure. The adjustment knob 22 is rotated clockwise or counter-clockwise to adjust the set point of the regulator 20. Retainer cap 28 is attached to spring housing 30 by a plurality of bolts 32, 34, 36 and 38. (Bolts 36 and 38 are not shown in this figure.) A first mounting bracket 40 is connected to a second mounting bracket 42, better seen in FIG. 2. The mounting brackets are secured by bolts 44 and 46.

The segmented body 50 includes a function segment 52, a supply segment 56 and a vent segment 60. These interconnected segments, 52, 56 and 60 are sometimes referred to as pucks, because of their resemblance to hockey pucks. The function segment 52 includes the function port 54. (The port 54 is also sometimes referred to as the regulated port, the cylinder port or simply the outlet). The supply segment 56 includes the supply port 58. (The port 58 is sometimes referred to as the inlet.) The vent segment 60 includes the vent port 62. (The port 62 is sometimes referred to as the vent.) Typically, each port is threaded to facilitate with piping, hose or some other type of conduit. The supply port 58 is connected to and is in fluid communication with a pressurized fluid supply source, not shown. The function port 54 is connected to and is in fluid communication with a downstream apparatus, not shown. The vent port 62 is in fluid communication with atmosphere. The spring housing 30 threadibly engages the body 50 at the function segment 52, as better seen in other figures.

FIG. 2 is a bottom view of the regulator 20 of FIG. 1. A plurality of bolts, 62, 64, 66 and 68 secure the vent segment 60 to the supply segment 66 and the function segment 52 as better seen in the next figure. A nametag 70 is secured to the bottom of the vent segment 60 by drive screws 72 and 74. First mounting bracket 40 is connected to second mounting bracket 42 by bolts 44 and 46.

Figure 3:
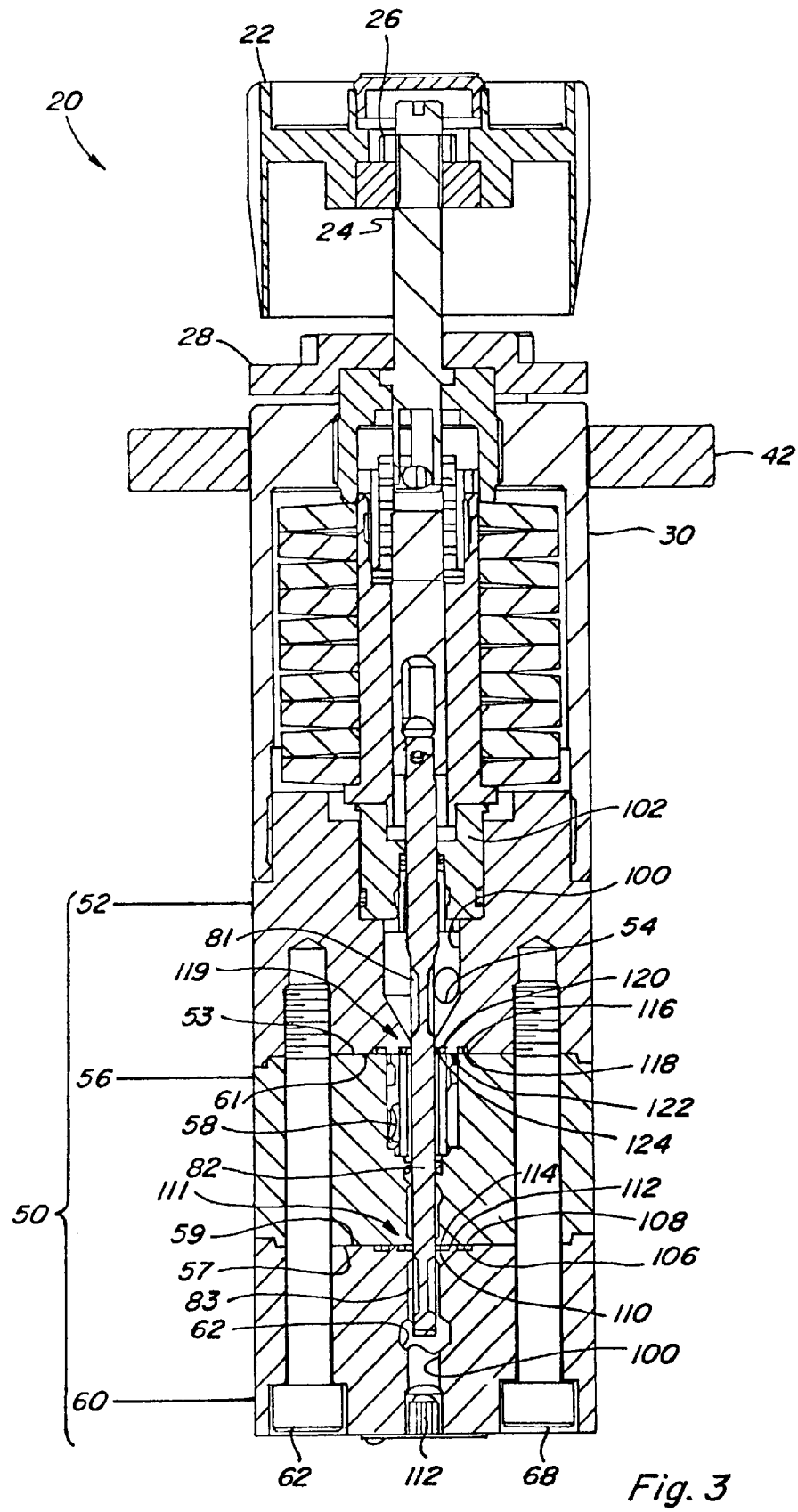
FIG. 3 is a section view of the regulator along line 3—3 of FIG. 2.

FIG. 3 is a section view of the regulator 20 along the line 3—3 of FIG. 2. This figure better illustrates how the segmented body 50 is assembled. Elongate bolts 62 and 68 pass through apertures in the vent segment 60, the supply segment 56 and engage threaded holes in the function segment 52. Though not shown in this figure, elongate bolts 64 and 66 likewise connect segments 52, 56 and 60. This design allows each segment, 52, 56 and 60 to be machined and put in inventory without porting. When an order is received each segment is drilled and taped for the specific port size and type required by the customer. This allows the manufacturer to reduce the amount of inventory required for this product because each of the respective segments 52, 56 and 60 can be ported on an as needed basis.

The function port 54, the supply port 58 and the vent port 62 can be ordered in various sizes including ¼ inch, ⅜ inch, ½ inch, 9/16 inch and perhaps others. Ports 54, 58 and 62 can also be tapped with various thread designs as required by the customer including Medium Pressure (MP), National Pipe Thread (NPT), Joint Industry Council (JIC) and Society of Automotive Engineers (SAE).

An axial passageway 100 is formed in the center of each of the respective body segments 52, 56 and 60. The shape of the axial passageway 100 varies along its length. The lower control stem 82 is positioned in the axial passageway 100. The lower control stem 82 moves up and down in the axial passageway in order to regulate the downstream pressure in the function port 54. (Port 54 is sometimes also referred to as a cylinder port).

In order to achieve a seal between the vent segment 60 and the supply segment 56, a channel 106 is formed on the interior face 57 of the vent segment 60 surrounding the axial passageway 100. An o-ring 108 is positioned in the channel 106 to achieve a seal between the vent segment 60 and the supply segment 56. Those skilled in the art will recognize that the o-ring 108 could also be positioned in the face 59 of the supply segment 56.

Figure 8:
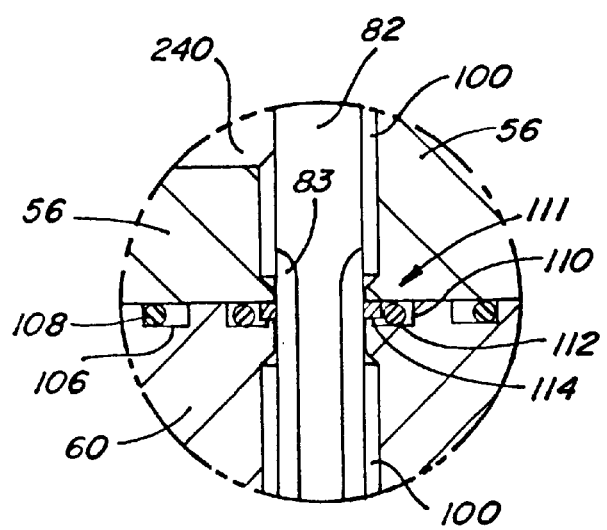
FIG. 8 is an enlargement of the vent seal assembly in the vent position as shown along the line 8 of FIG. 6.

A vent seal assembly generally identified by the numeral 111 achieves a seal between the body 50 and the lower control stem 82 at the junction of segments 56 and 60. A channel 110 is formed in the interior face 57 of the vent segment 60 to receive the vent seal assembly 111 which includes an o-ring 112 and a seal ring 114. The vent seal assembly 111, which is enlarged in FIG. 8, is bisectional as will be described in greater detail below. Those skilled in the art will recognize that the vent seal assembly could also be positioned in the face 59 of the supply segment 56.

In order to achieve a seal between the function segment 52 and the supply segment 56, a channel 116 is formed on the interior face 53 of the function segment 52. An o-ring 118 is positioned in the channel 116 to achieve a seal between the function segment 52 and the supply segment 56. Those skilled in the art will recognize that the o-ring 110 could also be placed in the face 61 of supply segment 56.

A supply seal assembly generally identified by the numeral 119 achieves a seal between the body 50 and the lower control stem 82 at the junction of segments 56 and 52. A channel 120 is formed on the interior face 53 of the function segment 52. The channel 120 receives the supply seal assembly 119 which includes an o-ring 122 and a seal ring 124. The supply seal assembly 119 is bi-directional like the vent seal assembly 111.

Figure 4:
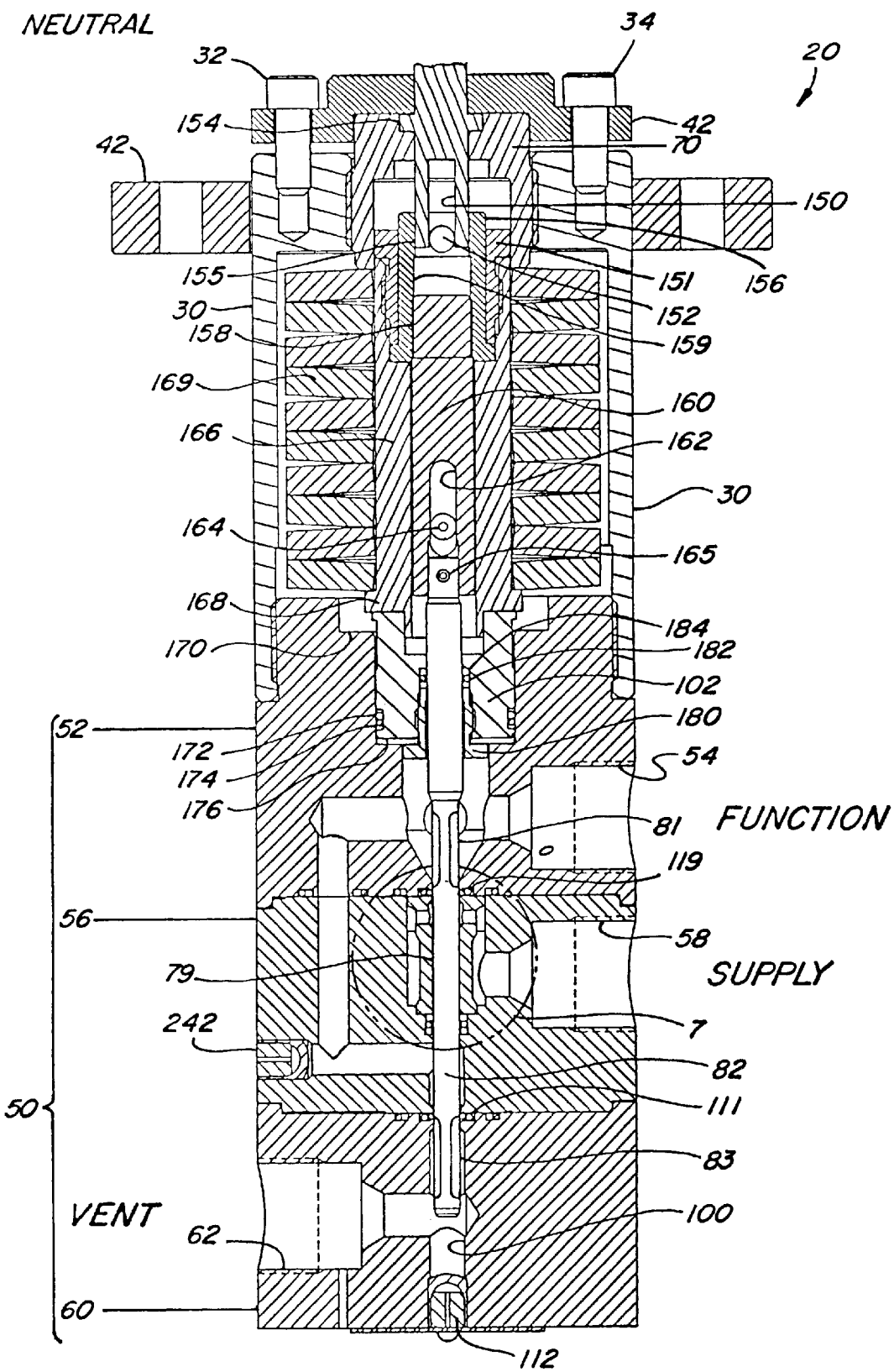
FIG. 4 is a sectional illustration of the regulator of FIG. 1 taken out of hand so all of the ports can be seen in one drawing. The regulator in FIG. 4 is in the no flow or neutral position. In production, the function, supply and vent ports are actually aligned as shown in FIG. 1.
Figure 5:
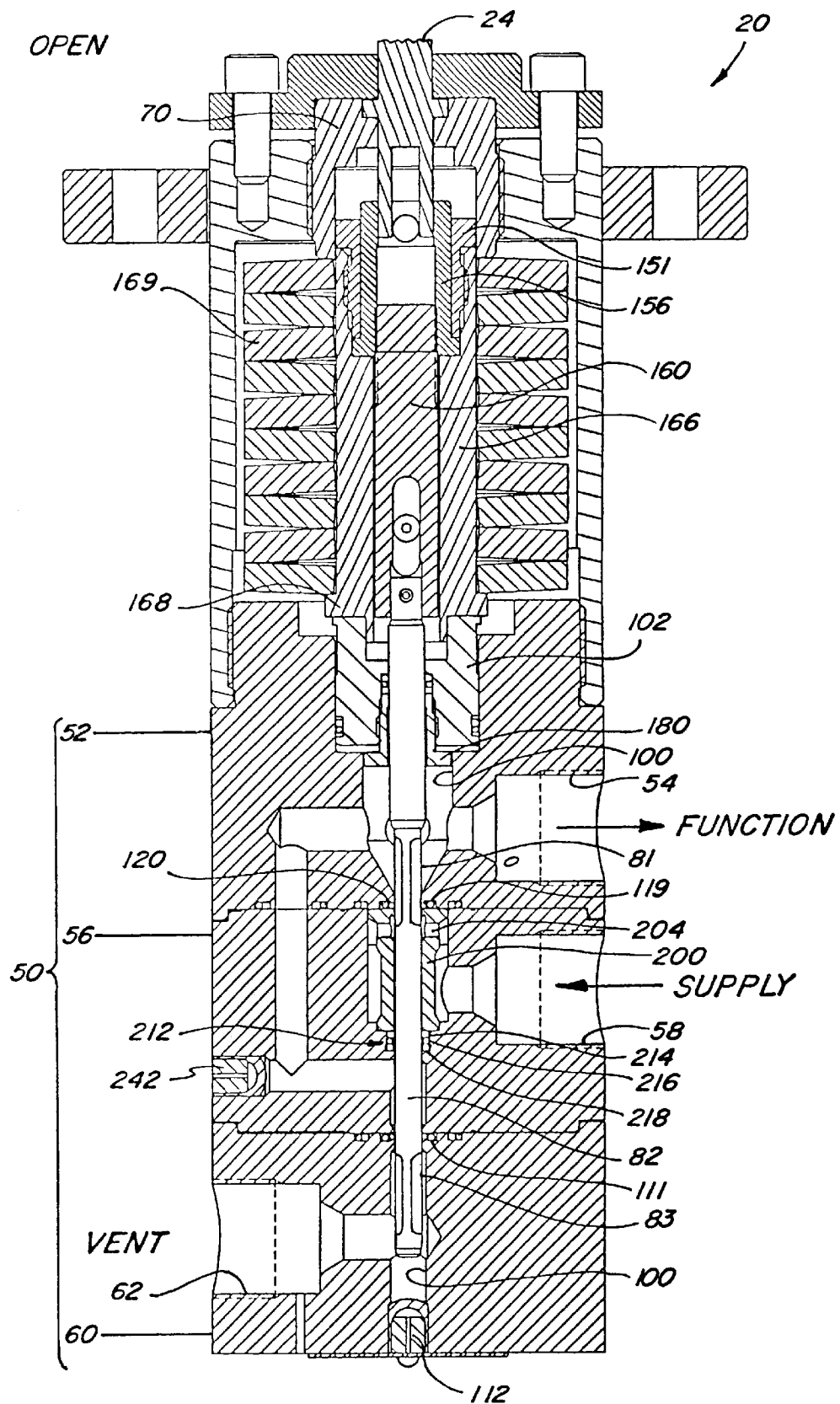
FIG. 5 is a sectional illustration of the regulator of FIG. 4, except the regulator is in the open position with fluid flowing from the supply port through the regulator to the function port as indicated by the flow arrows. Again, the ports are taken out of hand so all ports can be seen in one drawing.
Figure 6:
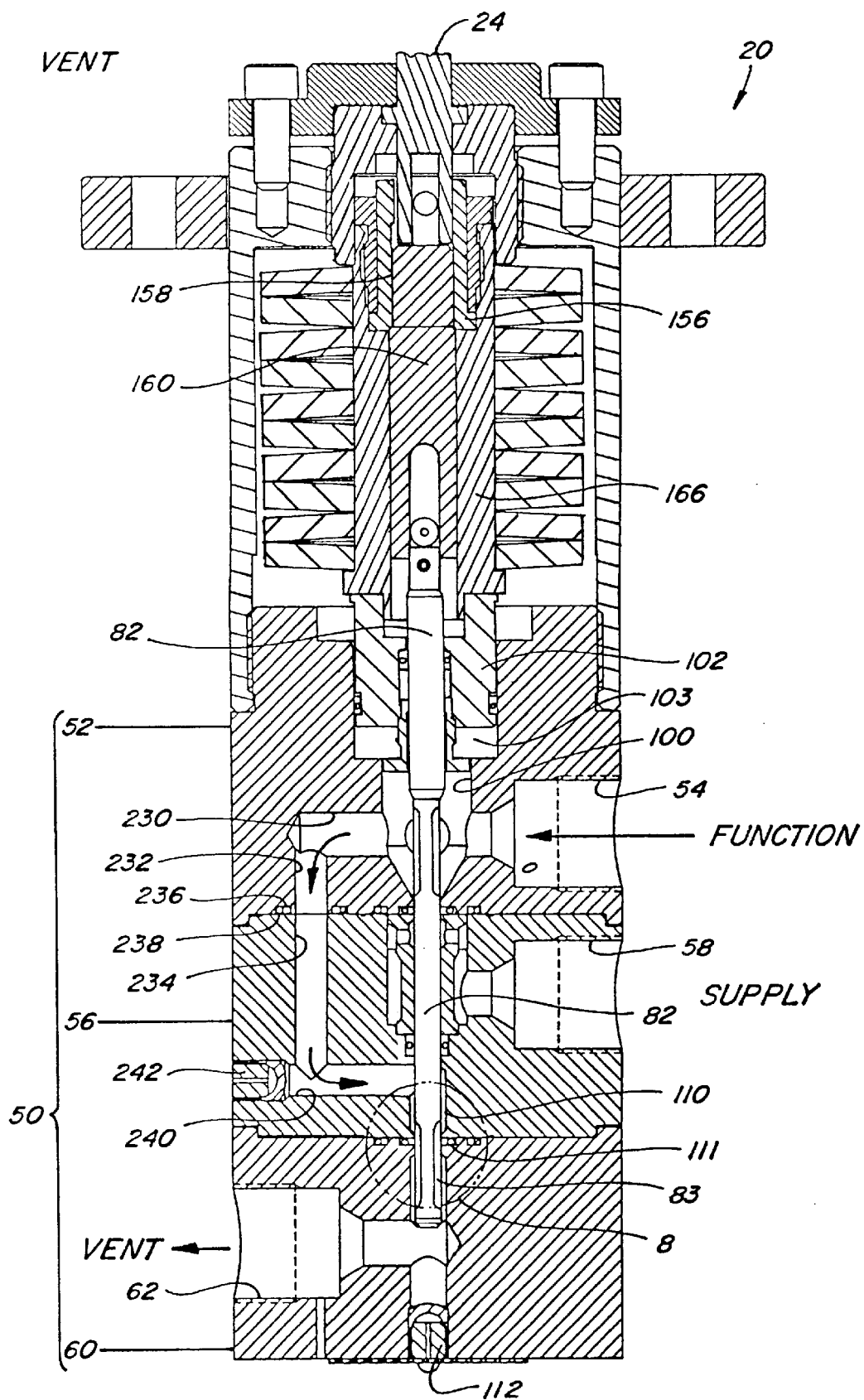
FIG. 6 is a sectional illustration of the regulator of FIG. 4 except the regulator is shown in the vent position with fluid flowing from the function port through the regulator and out the vent port as indicated by the flow arrows. Again, the ports are taken out of hand so all ports can be seen in one drawing.

The regulator 20 has three positions: the neutral or no flow position of FIG. 4, the open position of FIG. 5 and the vent position of FIG. 6. Like most regulators, the primary purpose of the present invention is to regulate or otherwise control the pressure at the function port 54 to a downstream apparatus. The set point (also called set pressure) can be adjusted up or down over a range of approximately 500 to 10,000 psi. In order to lower the regulated pressure or set point, the adjustment knob is turned counter clockwise. To raise the set point the adjustment knob 22 is turned clockwise.

When the regulator 20 moves from the neutral position of FIG. 4 to the open position of FIG. 5, the lower control stem 82 moves downward moving the upper flow slots 81 adjacent the supply seal assembly 119. Supply pressure then moves from the supply port 58 through the upper flow slots 81 and past the supply seal assembly 119, through the axial passageway 100 and out the function port 54. When the regulator 20 moves from the neutral position of FIG. 4 to the vent position of FIG. 6, the lower control stem 82 moves upward positioning the lower flow slots 83 adjacent the vent seal assembly 111. Excess pressure then moves from the function port 54 through other internal passageways and out the vent port 62 to atmosphere. The manner in which the lower control stem 82 moves up and down will be described below.

FIG. 4 is a sectional illustration of the regulator of FIG. 1 taken out of hand so all the ports can be seen in one drawing. In production, the ports are actually aligned as shown in FIG. 1. In FIG. 4, the regulator 20 is shown in the no flow or neutral position. In this position, the outer circumference 79 of the lower control stem 82 is in sealing engagement with the supply seal assembly 119 which in conjunction with the intermediate seal assembly 212 contains the supply pressure in the supply port 58. The outer circumference 79 of the lower control stem 82 is also in sealing engagement with the vent seal assembly 111 preventing any fluid from the function port 54 escaping to the vent port 62. Thus there is no fluid flow through the regulator 20 in FIG. 4.

As previously discussed, the adjustment knob 22, not shown in this figure, is rotated clockwise or counter-clockwise to adjust the set point which controls the regulated pressure in the function port 54. When the adjustment knob 22 is turned, this rotation is imparted to the adjustment stem 24. One end of the adjustment stem 24 is secured to the adjustment knob 22 with a jam nut 26. A clevis 150 is formed on the opposite end of the adjustment stem 24. The clevis 150 slips over the adjusting sleeve pin 152. An outwardly projecting circumferential flange 154 is formed in the mid-section of the adjustment stem 24. The flange 154 is captured between the retainer cap 42 and the spring retainer 70, allowing just enough room for the stem 24 to rotate. Therefore, the knob 24 and adjustment stem 24 can rotate but are fixed axially to the spring housing 30.

The adjusting sleeve 156 has a hollow bore 159 through the longitudinal axis and an outwardly extending circumferential flange 157 on one end. The stem retainer 151 threadibly engages the spring guide 166 and captures the outwardly extending radial circumferential flange 157 of the adjusting sleeve 156 against the bottom of the spring guide 166 counter bore, allowing just enough clearance for the adjusting sleeve 156 to rotate. Therefore, the adjustment sleeve 156 is allowed to rotate, but is fixed axially with respect to the spring guide 166.

The adjusting sleeve 156 has a transverse bore 151 on the end opposite the flange 157. The adjusting sleeve pin 152 passes through the transverse bore 151 in the adjusting sleeve 156 and the clevis 150 in the adjustment stem 24. Therefore, when the adjusting knob 22 is rotated, the adjustment stem 24, rotates as well as the adjusting sleeve pin 152 and the adjusting sleeve 156. The clevis 150 allows the adjusting sleeve 156 to move axially with respect to the adjustment stem 24 and knob 22. One end of the sleeve 156 has threads 158 below where the transverse bore 151 is positioned. The threads 158 engage threads 25 on the upper control stem 160. Axial pin 164 passes through a transverse hole 165 in the spring guide 166 and a transverse slot 162 in the upper control stem 160.

The pin 164 in the slot 162 allows the upper control stem 160 to move axially, but not rotationally with respect to the spring guide 166. The result is that as the adjusting sleeve 156 is rotated relative to the spring guide 166, the upper control stem 160 moves axially with respect to the spring guide 166. The lower control stem 82 is pinned to the upper control stem 160 by the pin 164. The two stems 82 and 160 move axially together.

Thus, rotation of the knob 22 causes the upper control stem 160 and the lower control stem 82 to move axially with respect to the spring guide 166, while allowing the spring guide 166 to move axially with respect to the knob 22, spring housing 30 and valve body 50. Thus, rotating the knob 22 counter-clockwise brings the set point to o psi and rotating the knob 22 clockwise brings the regulator 20 to its maximum set point.

The spring guide 166 includes an outwardly extending radial flange 168 on one end which captures the belleville spring 169 against the spring retainer 70. The belleville spring 169 has a longitudinal central opening 171 sized and arranged to receive the spring guide 166. The spring guide pin 167 passes through a transverse bore 165 in the spring guide 166 and slips back and forth in the slot 162 of the upper control stem 160. This feature allows adjustment of the lower control stem 82 independent of the spring 169. Rotation of the knob 22 does not increase or decrease the force being applied against the spring 169 by the spring guide 166. The force that is applied to the spring 169 is applied through the sensor piston 102 that is in contact with the flange 108 of the spring guide 166. Pressure from the function port 54 is applied against the sensor piston 102 which is then transferred via the flange 168 on the spring guide 166 to the spring 169.

The sensor piston 102 threadibly engages the retaining nut 180. The sensor piston 102 includes an external o-ring groove 172, which receives o-ring 174 and a back up ring. The o-ring 174 and back-up ring achieve a dynamic seal between the function segment of body 50 and the sensor piston 102. The sensor piston also has an axial through hole sized to receive the lower control stem 82. The retaining nut 180 captures the o-ring 182 and another back-up ring 184 to achieve a dynamic seal between the sensor piston 102 and the lower control stem 82. The lower control stem 82 includes a plurality of flow slits 81 that permit fluid flow from the supply port 58 to the function port 54 when the flow slits 81 are proximate the supply seal assembly 119. A second set of flow slits 83 are formed in the lower control stem 82 which permit fluid to flow from the function port 54 to the vent port 62 when the flow slits 83 are proximate the vent seal assembly 111.

FIG. 5 is a sectional illustration of the regulator of FIG. 1 taken out of hand so all of the ports can be seen in one drawing. In FIG. 5 is a sectional illustration of the regulator 20 in the open position allowing fluid to flow from the supply port 58 to the function port 54 which raises downstream pressure to the predetermined set point. In order to move from the no-flow or neutral position of FIG. 4 to the open position of FIG. 5, the lower control stem 82 must move downwards causing the upper flow slots 81 to move proximate the supply seal assembly 119 thus allowing fluid to flow from the supply port 58 through the flow slits 81 to the function port 54. The present regulator is rated to operate at pressures of up to 10,000 psi. The maximum flow rate is approximately 10 gpm. However, more typical flow rates will be in the range of 3–5 gpm when the regulator 20 is in the open position of FIG. 5.

The lower control stem 82 is moved downward as shown in FIG. 5 by rotating the control knob 22 clockwise. This adjusts the set point in the function port 54. When the control knob 22 is rotated clockwise, the adjustment stem 24 to the adjustment stem 24 is rotated clockwise which rotation is then imparted through the adjusting sleeve pin 152 to the adjusting sleeve 156. The reverse threads 158 on the adjusting sleeve 156 and the threads 161 on the upper control stem 160 cause the upper control stem 160 to move downward in response to the clockwise rotation of the control knob 22. The upper control stem 160 is able to move downward because of the slot 162 which allows axial movement vis-a-vis the spring guide pin 167. The lower control stem 82 is connected to the upper control stem 160 by the control stem pin 164. The upper control stem 160 and the lower control stem 82 move axially as a unit. As a matter of manufacturing choice, the upper control stem 160 and the lower control stem 82 could be fabricated as a single part.

As the lower control stem 82 moves downward, the outer circumference 79 of the lower control stem 52 moves away from the supply seal assembly 119, thus allowing fluid to pass through the flow slits 81 in the lower control stem 82, through the bore 10, to the function port 54, as shown by the flow arrows in the drawing. After the pressure in the function port 54 increases to set point or set pressure, axial force from the fluid in passageway 100 is exerted upon the retaining nut 180 and the sensor piston 120. As the sensor piston moves upward, it transfers the axial force to the flange 168 of the spring guide 166, thus compressing the spring 169. As the spring guide 166 moves upward, this axial movement is transferred to the stem retainer 151 and the adjusting sleeve 156. The threads 158 in the adjusting sleeve 158 engage the threads 161 on the upper control stem 160, thus imparting upward axial movement to the lower control stem 82, thus moving the lower control stem 82 upward, when the adjusting sleeve 156 moves upward. As the lower control stem 82 moves upward the flow slits 81 move upward and the outer circumference 79 of the lower control stem 82 again engages the supply seal assembly 119, thus blocking further flow from the supply port 58 into the function port 54.

If, for some reason, the regulated pressure drops (i.e., the pressure in the function port 54), the spring 169 will relax. The sensor piston 102 will move downward until the flow slits 81 are proximate to the supply seal assembly 119. Fluid will flow from the supply port 26 until the pressure increases to the set point which will be enough to move the outer circumference 79 of the lower control stem 82 back into engagement with the supply seal assembly 119.

The supply seal assembly 119 is held in place in the function segment 52 by the upper end 206 of the sleeve 200. This relationship is better seen in the enlargement, FIG. 7. The sleeve 200 has a longitudinal bore 202 which is sized and arranged to allow the lower control stem 82 to move freely relative to the sleeve 200. A plurality of transverse bores 204 allow fluid communication between the longitudal bore 202 of the sleeve 200 and the axial bore 100 of the regulator 20.

The other end 208 of the sleeve 200 holds an intermediate seal assembly 212 in place. The intermediate seal assembly 212 is not bi-directional. This intermediate seal assembly 212 is positioned in a channel 214 in the supply segment 56 of the body 50. The channel 214 holds the intermediate seal assembly 212 which consists of an o-ring 216 and a back-up ring 218. The intermediate seal assembly 212 forms a seal between the lower control stem 82 and the supply segment 56 of the body 50 to prevent supply pressure from escaping to vent. Supply pressure is therefore isolated in the supply port 58 by the intermediate seal assembly 212, the supply seal assembly 119 and the o-ring 118.

When there is an excess pressure in the function port 54, the lower control stem 82 moves axially upward, thus allowing the fluid to move from the function port 54 to the vent port 62, as better seen in the next figure.

FIG. 6 is a sectional illustration of the regulator 20 of FIG. 1 taken out of hand so all of the ports can been seen in one drawing. In FIG. 6 of the regulator 20 in the vent position. On occasion, downstream pressure exceeds the set point or controlled pressure and it is necessary to vent this excess pressure to atmosphere. When this occurs, the excess pressure in the function port 54 drives the sensor piston 102 upward. As the sensor piston 102 moves upward, so does the lower control stem 82. When the lower flow slots 83 move proximate the vent seal assembly 111, fluid flows from the function port 54 through various internal passageways and out the vent port 62. Fluid flows though the lower flow slots 83 past the vent seal assembly 111.

The function port 54 is in fluid communication with the axial passageway 100 and another passageway 230. Another passageway 232 is formed in the function segment of the body 50. Another vertical passageway 234 is formed in the supply segment 56 of the body 50 and is aligned and in fluid communication with the passageway 232 in the function section 52 of the body 50. In order to form a seal at the junction of the passageways 232 and 234, a channel 236 is formed in the face 53 of the function section 52. An o-ring 238 is positioned in the channel 236 to form a seal between the function segment 52, the supply segment 56 and the passageways 232 and 234. Another passageway 240 is formed in the supply section 56 of the body 50. Passageway 240 is in fluid communication with passageway 234 and axial passageway 100. Passageway 240 is sealed to atmosphere by a lee-type plug 242.

When venting, fluid moves as indicated by the flow arrows from the function port 54, through the axial passageway 100, the passageway 230, the passageway 232, the passageway 234, the passageway 240 and back to the axial passageway 100. The fluid then moves through the lower flow slots 83 in the lower control stem 82 thus passing the vent seal assembly 111 back into the axial passageway 100 and thereafter exiting the regulator 20 at vent port 62.

As the venting process occurs, the amount of pressure on the sensor piston 102 diminishes. When this overcomes a predetermined set point, the force in the spring 58 overcomes the forces in the sensor piston chamber 103, thus driving the spring guide 166 back to its lower position of FIG. 4. When the spring guide 166 moves axially downward, it causes the upper control stem 160 and the lower control stem 82 to move downward, which causes the lower flow slots 83 to move downward and thus the outside circumference 79 of the lower control stem 82 re-engages with the vent seal assembly 111 thus stopping fluid flow to vent.

The lower control stem 82 has maximum up and down axial positions of travel caused by rotation of the knob 22. When the knob 22 is turned counter clockwise, the lower control stem 82 moves downward (i.e. away from the knob 22) to a zero psi set point (because of the reverse threads). The maximum downward position of travel of control stem 82 is reached when the spring guide pin contacts the upper extremity 173 of slot 162 in upper control stem 160. If the knob 22 is further rotated counter clockwise when the lower control stem 82 is in its maximum downward position, various internal components will rotate rather than strip or otherwise damage the regulator 20. The following "spinning" components freely rotate when the knob 22 is rotated infinitely in a counter clockwise direction: the adjustment stem 24, the adjusting sleeve pin 152, the adjusting sleeve 156, the upper control stem 160, the spring guide pin 167, the spring guide 166, the stem retainer 151, the control stem pin 165 and the lower control stem 82.

When the knob 22 is turned clockwise, the lower control stem 82 moves upward (i.e. towards the knob 22) because of the reverse threads, to a maximum psi set point. The maximum upward position of travel of lower control stem 82 is reached when the spring guide pin contacts the lower extremity 171 of slot 162 in the upper control stem 160. If the knob 22 is further rotated clockwise when the lower control stem 82 is in its maximum upward position, various internal components will freely rotate rather than strip or otherwise damage the regulator. The same "spinning" components listed above freely rotate when the knob 22 is rotated infinitely in a clockwise direction.

The movement of the control stem from the maximum up position to the maximum down position is approximately 0.025 inches. However, in operation, the typical amount of movement from the open position in FIG. 5 to the vent position of FIG. 6 is from approximately 0.010 inch to 0.020 inch. Other distances may be suitable depending on the size of the regulator and other manufacturing considerations.

The ability of the "spinning" components to freely rotate when the knob 22 is infinitely rotated clockwise or counter clockwise is due to the overall design of the valve and the bi-directional seal assemblies 119 and 111. The ability of the "spinning" components to freely rotate when the knob 22 is infinitely rotated prevents damage and stripping to the regulator 20.

Figure 7:
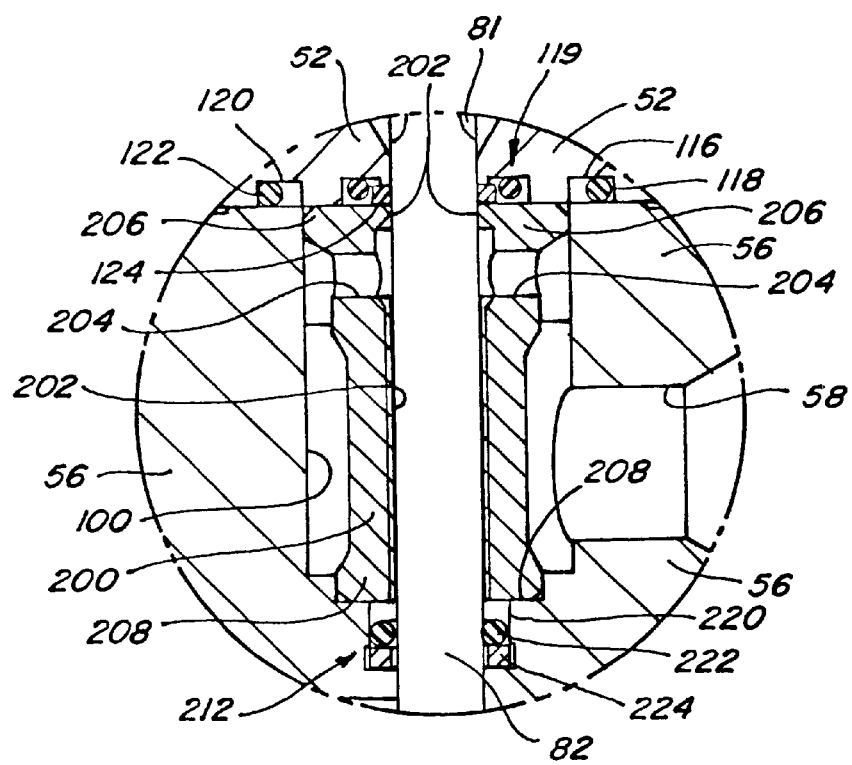
FIG. 7 is an enlargement of the supply seal assembly in the neutral position as shown along the line 7 of FIG. 4.

FIG. 7 is an enlargement of a portion of the regulator 20 along the line 7 from FIG. 4. FIG. 7 shows the regulator 20 in the neutral or no-flow position. In the no flow position, the outer circumference 79 of the control stem 82 seals against the seal ring 124 of the supply seal assembly 119. The upper flow slots 81 on the lower control stem 82 are positioned above the supply seal assembly 119 in the no flow position thus precluding any fluid flow from the supply port 58 past the supply seal assembly 119. Fluid in the supply port 58 is contained because of the supply seal assembly 119, the intermediate seal assembly 212 and the o-ring 118.

FIG. 8 is an enlargement of the portion of the regulator 20 along the line 8 of FIG. 6. FIG. 8 shows the regulation 20 in the vent position with the flow slits 83 adjacent the vent seal assembly 111. When venting, fluid moves from the passageway 240 through the axial passageway 100 through the lower flow slots 83 past the vent seal assembly 111 and back into the axial passageway 100 in the vent segment 60 of the body 50 to vent port 62.

Figure 9:
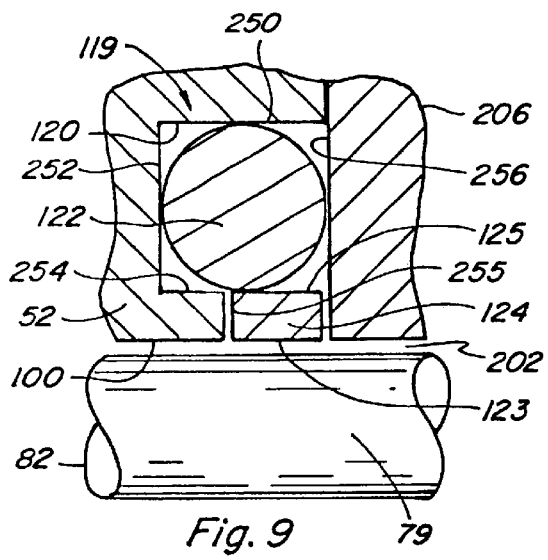
FIG. 9 is an enlarged section view of one-half of the bi-directional supply seal assembly and control stem without any force being exerted on the o-ring or the seal ring. This is sometimes referred to as the un-energized position.
Figure 10:
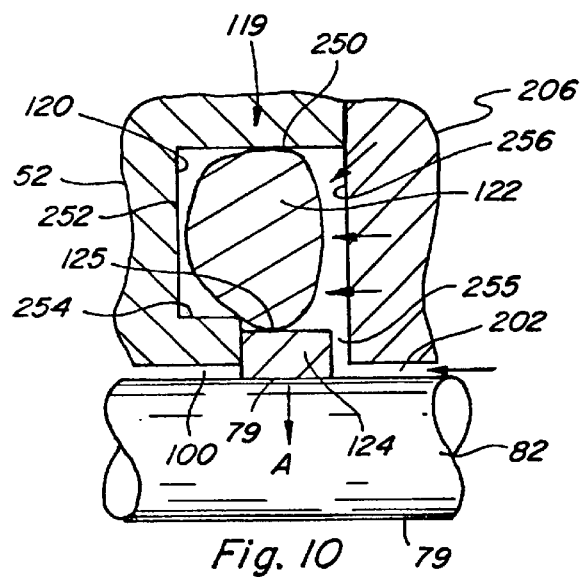
FIG. 10 is an enlarged section view of a portion of the bi-directional supply seal assembly in the energized position. Pressure is being exerted on the o-ring and the seal ring as indicated by the arrows.
Figure 11:
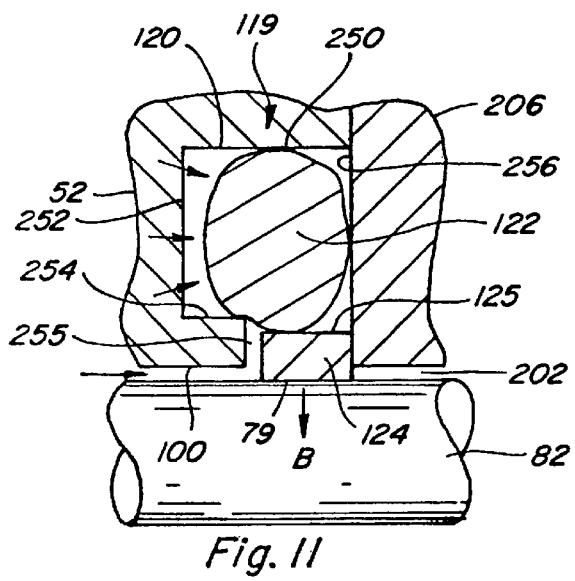
FIG. 11 is an enlarged section view of a portion of the bi-directional supply seal assembly in the energized position. Pressure from the opposite direction is being exerted against the o-ring and the seal ring as indicated by the arrows.

FIGS. 9, 10 and 11 are cross-sectional enlargements of a portion of the bi-directional supply seal assembly 119. The bi-directional vent seal assembly 111 functions in a similar fashion to the supply seal assembly 119 and is configured in a similar, but opposite arrangement as seen in FIG. 8. FIG. 9 shows the seal in the unenergized position. FIG. 10 shows the seal energized by downstream pressure indicated by the arrows. FIG. 11 shows the seal energized in the opposite direction by upstream pressure indicated by the arrows. In FIG. 10 and FIG. 11 a seal is achieved between the seal ring 124 and the exterior circumference 79 of the control stem 82 as a result of forces that are applied against the o-ring 122 which urges the seal ring 124 into sealing engagement with the lower control stem 82.

The adjustment assembly moves the control stem (i.e., the upper control stem 160 and the lower control stem 82) axially from the neutral position to the open position to regulate pressure in the function port 54, to the downstream apparatus and to move the control stem axially from the neutral position to the vent position when excess pressure occurs in the function port 54 to vent the excess pressure to atmosphere. For purposes of claim interpretation, the term adjustment assembly includes the adjustment knob 22, the adjustment stem 24, the spring housing 30, the spring 169, the spring guide 166, the spring guide pin 167, the sensor piston 102, the adjusting sleeve 156, the adjusting sleeve pin, and the stem retainer 151.

FIG. 9 is an enlarged section view of one-half of the supply seal assembly 119. A channel 120 also referred to as an o-ring support structure, is defined by four walls. The channel 120 includes a first wall 250 a second wall 252, a third wall 254 and a fourth wall 256. Walls 250, 252 and 254 are formed in the function segment 52 of the body 50. The fourth wall 256 is formed by he upper portion 206 of sleeve 200. The walls 250 and 254 are parallel. The walls 252 and 256 are also parallel. The wall 254 extends less than half the length of the wall 250, thus creating an opening 255 from the channel 120 to the axial bore 100. A flat seal ring 124 is positioned in the opening 255 between the wall 254 and the wall 256 of sleeve 200. The o-ring 122 is positioned in the channel 120. The lower control stem 82 is shown in reduced perspective to save space; the drawing is not proportioned to the size of the o-ring 122 in the actual embodiment.

Applicants have found that a ⅜ inch outside diameter×¼ inch inside diameter×¹⁄₁₆ inch cross-section BUNA N90 duro National C67 compound o-ring is suitable for the o-ring 122. Other o-rings with similar properties from other manufacturers such as Parker may also be suitable. Applicants have found that a 0.260 inch outside diameter×0.184 inch inside diameter×0.034 inch thick seal ring manufactured from PEEK (polyethetherketone) is suitable for the seal ring 124. Other materials with similar rigidity and strength properties to PEEK may also be suitable.

Those skilled in the art will understand that the seal ring 124 is circular in shape and fully surrounds and contacts the outside circumference 79 of the lower control stem 82 when the seal assembly is energized. They will likewise recognize that the o-ring 122 is circular in shape and therefore it completely encircles but does not contact the lower control stem 82.

FIG. 10 is an enlarged section view of a portion of the supply seal assembly 119 showing the seal being energized by upstream fluid pressure from supply port 58. The supply seal assembly 119 is energized by upstream fluid pressure from supply port 58 when the regulator is the neutral position of FIG. 4. When the seal is energized as shown in FIG. 10 it prevents the fluid pressure in the supply port 58 from passing to the function port 54. To energize the supply seal assembly, upstream fluid pressure from the supply port 58 moves through the axial passageway 100 through the bores 204 in the sleeve 200 and through the bore 202 of sleeve 200. The force of the hydraulic fluid, as indicated by the arrows, compresses and distorts the o-ring 122 causing it to protrude into the opening 255 and contact the outside circumference 125 of seal ring 124. When it protrudes into the opening 255, it exerts force on the seal ring 124 as indicated by the arrow A. This force achieves a seal between the outer circumference 79 of the lower control stem 82 and the inner circumference 123 of seal ring 124 thus preventing supply pressure to move from the supply port 58 to the function port 54.

FIG. 11 shows the bi-directional supply seal assembly 119 energized in the opposite direction of FIG. 10. FIG. 11 shows the supply seal assembly 119 energized by downstream forces as it would be when the regulator 20 is venting as shown in FIG. 6. In the vent position, excess pressure from the function port 54 moves down the axial passageway 100 and enters the channel- 120 compressing and distorting the o-ring as shown by the arrows. The o-ring 122 then exerts pressure against the outside circumference 125 of seal ring 124 in the direction of the arrow B. A seal is therefore achieved between the seal ring 124 and the lower control stem 82 preventing over-pressure from moving from the function port 54 to the supply port 858.

The vent seal assembly 111 is also bi-directional. When the regulator 20 is in the no-flow position of FIG. 4, upstream fluid pressure from the supply port 58 energizes the vent seal assembly 111 achieving a seal between the seal ring 114 and the lower control stem 82, preventing supply pressure from escaping to vent. Specifically, the upstream fluid pressure enters the channel 110 compressing and distorting the o-ring 112 which exerts pressure against the outside circumference 113 of the seal ring 114. The inside circumference 115 of the seal ring 114 then achieves a seal with the outside circumference 79 of the lower control stem 82.

When the regulator 20 moves to the vent position of FIG. 6, downstream fluid pressure from the function port 54 energizes the vent seal assembly 111 from the opposite direction, achieving a seal between the seal ring 114 and the lower control stem 79 preventing excess pressure from entering the supply port 58. Specifically, the downstream fluid pressure enters the channel 111 compressing the o-ring 112 from the opposite direction. The o-ring 112 exerts pressure against the outside circumference 113 of the seal ring 114. The inside circumference 115 of the seal ring is then urged into sealing contact with the outside circumference 81 of the lower control stem 81.

Figure 12:
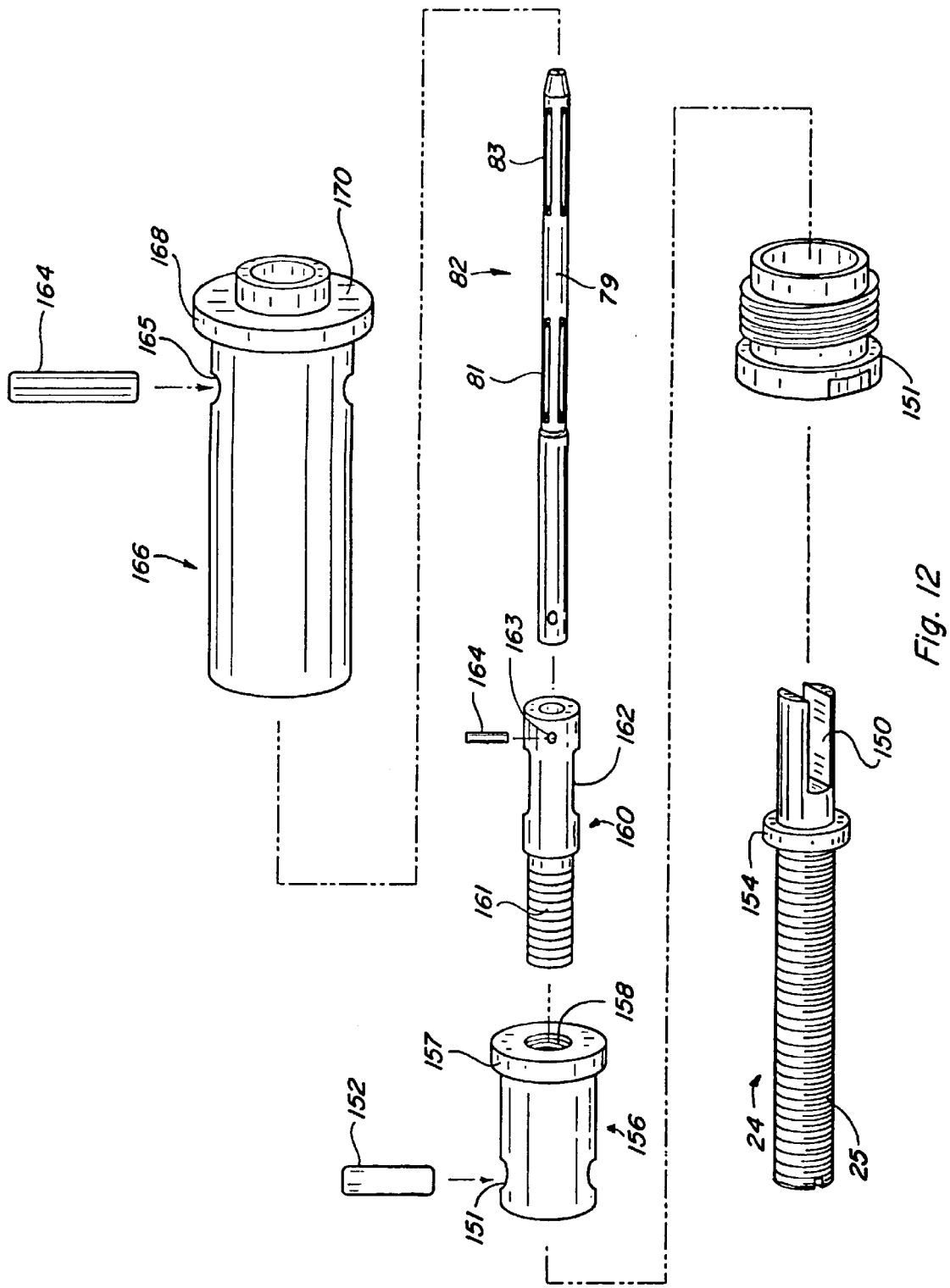
FIG. 12 is an enlarged perspective view of the control stem and other internal components of the regulator of FIG. 4.

FIG. 12 is an exploded perspective view of some of the internal components of the regulator 20. The lower control stem 82 is connected to the upper control stem 160 by the control stem pin 164 which passes through opposing bores 163 and 165 in the upper control seem 160. Threads 161 on the upper control stem 160 threadably engage the internal bore 158 of the adjusting sleeve 156. The clevis 150 of adjustment stem 24 engages the adjusting sleeve pin 152. Pin 152 passes through transverse bore 151 in adjusting sleeve 156. When the adjustment stem 24 is rotated by the adjustment knob 22, it causes the adjusting sleeve 156 to rotate. When the adjusting sleeve 156 rotates it causes the upper control stem 160 and the lower control stem 182 to move axially relative to the regulator 20 because of the threaded engagement at 158. In this manner, the set point of the regulator can be adjusted up or down. Rotation of the adjustment 22 counter-clockwise brings the set point of the regulator to zero psi and rotation clockwise brings the regulator 20 to its maximum set point.

Figure 13:
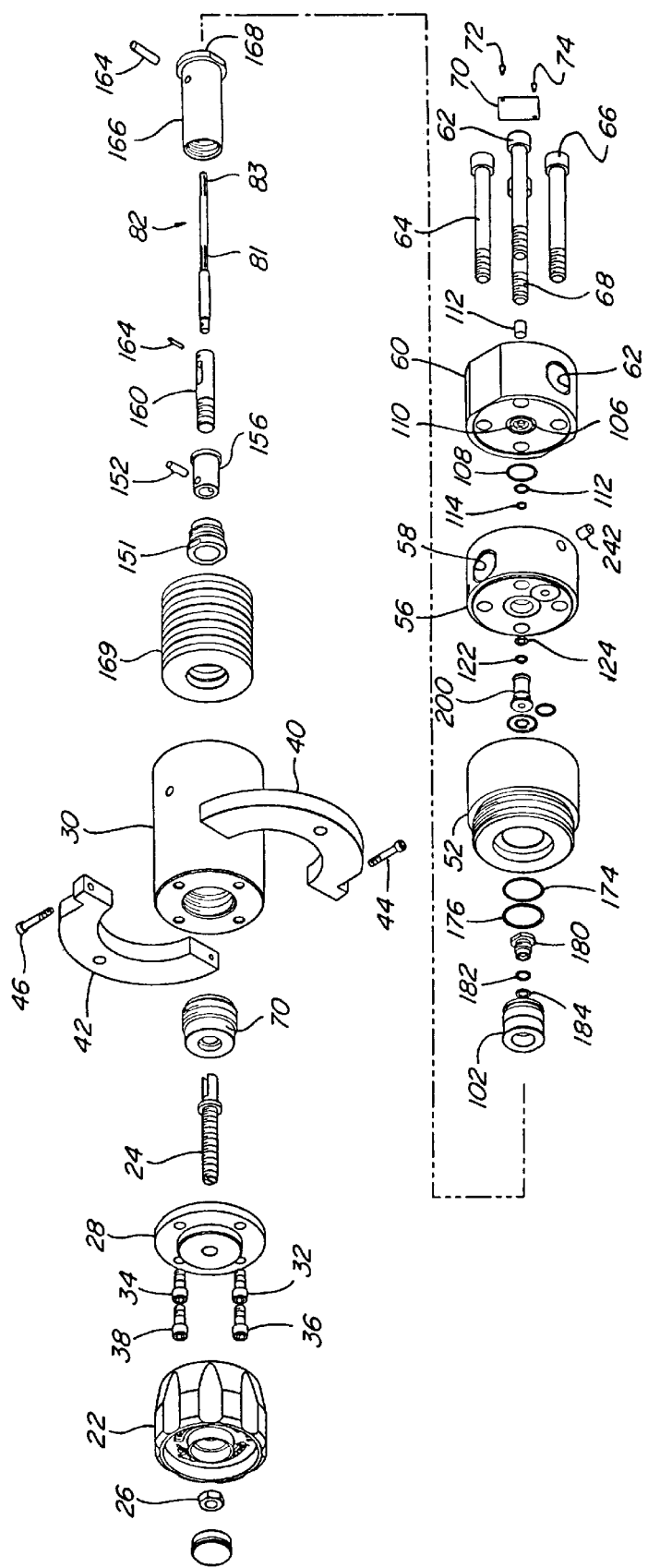
FIG. 13 is an exploded perspective view of all components of the regulator of FIG. 4.

FIG. 13 is an exploded view of the regulator with segmented body 20. The regulator 20 use fewer parts than the prior Gilmore design No. 44820, also described in U.S. patent application Ser. No. 09/640,401 filed on Aug. 16, 2000 and is therefore more economical to produce. It is also easier to assemble. This design also eliminates many of the small precision parts required in prior art designs. This design uses lee plugs instead of JIC plugs.

The adjustment knob 22 is attached to the adjustment stem 24 by a jam nut 26. The retainer cap 28 is connected to the spring housing 30 by bolts 32, 34, 36 and 38. The adjustment stem 24 is captured between the retainer cap 28 and the spring housing 30 so that it does not move axially. The adjustment stem 24 can be rotated by movement of the adjustment knob 22. The belleville spring 169 is captured between the flange 168 on the spring guide 166 and the bottom end of the spring retainer 70. Bolts 62, 64, 66 and 68 pass through holes in the vent segment 60 and the supply segment 58 and threadably engage holes in the function segment 52. Four bolts 62, 64, 66 and 68 secure the interconnected segments 52, 56 and 58 thus forming the body 50. Other securing means may also be used to interconnect the segments 52, 56 and 58 to form the body 50. The seals and other internal components have been previously described.

What is claimed is:

1. A regulator connected to a pressurized fluid supply and a downstream apparatus to regulate the pressure to the downstream apparatus and to vent excess pressure to atmosphere, the regulator comprising:

a body having three interconnected segments including a vent segment, a supply segment and a function segment;

the vent segment defining a vent port connected to atmosphere, the supply segment defining a supply port connected to the pressurized fluid supply and the function segment defining a function port connected to the downstream apparatus;

an axial bore in the body sized and arranged to receive an elongate control stem movable from a neutral position to an open position and a vent position;

a supply seal assembly positioned in the body and encircling the control stem, to seal with the control stem and body to selectively allow the flow of fluid from the supply port to the function port as the control stem moves axially from the neutral position to the open postilion;

a vent seal assembly positioned in the body and encircling the control stem to seal with the control stem and the body to selectively allow the flow of fluid from the function port to the vent port as the control stem moves axially from the neutral position to the vent position; and an adjustment assembly to move the control stem axially from the neutral position to the open position to regulate pressure in the function port to the downstream apparatus and to move the control stem axially from the neutral position to the vent position when excess pressure occurs in the function port to vent the excess pressure to atmosphere.

2. The apparatus of claim 1 wherein the adjustment assembly comprises:

a spring housing connected to the body;

an adjustment stem having a knob on one end and a clevis on the other end with the knob on an outside of the spring housing, the adjustment stem and clevis rotating when the knob is rotated;

a spring having a longitudinal center opening;

an elongate tubular spring guide having a circumferential flange on one end, the spring carried by the tubular spring guide and being captured between the circumferential flange and a spring retainer, the tubular spring guide having a hollow longitudinal central bore and a transverse aperture;

an elongate adjusting sleeve having an axial central bore, the adjusting sleeve having a radial flange on one end and a transverse hole in the other end, the clevis of the adjustment stem being inserted in the axial central bore and the adjusting sleeve positioned in the hollow-longitudinal central bore of the spring guide on the end opposite the circumferential flange;

an adjusting sleeve pin sized and arranged to fit in the transverse bore in the adjusting sleeve and to engage an opening in the clevis so rotation of the knob and adjustment stem causes like rotation of the adjusting sleeve;

a stem retainer engaging the hollow central bore of the spring guide trapping the adjusting sleeve in the spring guide and causing the adjusting sleeve and stem retainer to move axially with the spring guide;

the elongate control stem having a transverse slot, the control stem connected with reverse threads to the axial bore of the adjusting sleeve so rotation of the knob, adjustment stem and adjusting sleeve causes axial movement of the control stem;

a spring guide pin sized and arranged to fit in the transverse aperture of the spring guide and to pass through the transverse slot in the control stem; and a sensor piston mounted in the body and exposed to pressurized fluid in the function port, the sensor piston abutting the spring guide so force from the pressurized fluid is transferred through the sensor piston and spring guide to the spring causing axial movement of the spring guide, stem retainer, adjusting sleeve and control stem to achieve regulation of the pressure in the function port.

3. A regulator rated for operational pressures of up to 10,000 psi connected to a pressurized fluid supply and a downstream apparatus to regulate the pressure to the downstream apparatus and to vent excess pressure to atmosphere, the regulator comprising:

a body having three interconnected segments including a vent segment, a supply segment and a function segment;

the vent segment defining a vent connected to atmosphere, the supply segment defining an inlet connected to the pressurized fluid supply and the function segment defining an outlet connected to the downstream apparatus;

an axial bore in the body sized and arranged to receive an elongate control stem movable from a neutral position to an open position and a vent position;

a supply seal assembly positioned in the body and encircling the control stem, to seal with the control stem and body to selectively allow the flow of fluid from the supply port to the function port as the control stem moves axially from the neutral position to the open position;

a vent seal assembly positioned in the body and encircling the control stem to seal with the control stem and the body to selectively allow the flow of fluid from the outlet to the vent as the control stem moves axially from the neutral position to the vent position;

an adjustment assembly to move the control stem axially from the neutral position to the open position to regulate pressure in the outlet to the downstream apparatus and to move the control stem axially from the neutral position to the vent position when an excess pressure occurs in the outlet to vent the excess pressure to atmosphere; and the regulator having a forward and reverse adjustment dead band of less than 50 psi, a droop dead band of approximately 125 psi and an accumulation dead band of approximately 6% of set pressure.

4. The apparatus of claim 3 wherein the adjustment assembly comprises:

a spring housing connected to the body;

an adjustment stem having a knob on one end and a clevis on the other end with the knob on an outside of the spring housing, the adjustment stem and clevis rotating when the knob is rotated;

a spring having a longitudinal center opening;

an elongate tubular spring guide having a circumferential flange on one end, the spring carried by the tubular spring guide and being captured between the circumferential flange and a spring retainer, the tubular spring guide having a hollow longitudinal central bore and a transverse aperture;

an elongate adjusting sleeve having an axial central bore, the adjusting sleeve having a radial flange on one end and a transverse bore in the other end, the clevis of the adjustment stem being inserted in the axial central bore and the adjusting sleeve positioned in the hollow longitudinal central bore of the spring guide on the end opposite the circumferential flange;

an adjusting sleeve pin sized and arranged to fit in the transverse bore in the adjusting sleeve and to engage an opening in the clevis so rotation of the knob and adjustment stem causes like rotation of the adjusting sleeve;

a stem retainer engaging the hollow central bore of the spring guide trapping the adjusting sleeve in the spring guide and causing the adjusting sleeve and stem retainer to move axially with the spring guide;

an elongate control stem having a transverse slot, the control stem connected with reverse threads to the axial bore of the adjusting sleeve so rotation of the knob, adjustment stem and adjusting sleeve causes axial movement of the control stem;

a spring guide pin sized and arranged to fit in the transverse aperture of the spring guide and to pass through the transverse slot in the control stem; and a sensor piston mounted in the body and exposed to pressurized fluid in the outlet, the sensor piston abutting the spring guide so pressure from the pressurized fluid is transferred through the sensor piston and spring guide to the spring causing axial movement of the spring guide, stem retainer, adjusting sleeve and control stem to achieve regulation of the pressure in the outlet.

5. A regulator connected to a pressurized fluid supply and a downstream apparatus to regulate the pressure to the downstream apparatus and to vent excess pressure to atmosphere, the regulator comprising:

a body defining a vent port connected to atmosphere, a supply port connected to the pressurized fluid supply and a function port connected to a downstream apparatus;

an elongate control stem having a plurality of upper flow slots and a plurality of lower flow slots, the control stem moving axially in an axial bore in the body;

an adjustment knob positioned outside the body at the top of the regulator, the knob operatively connected to the control stem to adjust the set pressure of the regulator;

a supply seal assembly positioned in the body and encircling the control stem to selectively seal the body to the control stem;

a vent seal assembly positioned in the body and encircling the control stem to selectively seal the body to the control stem; and a sensor piston and spring operatively connected to the control stem to move the control stern and upper flow slots axially towards the supply seal assembly when pressure in the function port falls below set pressure so the upper flow slots are proximate the supply seal assembly allowing fluid to flow from the supply port to the function port, and when excess pressure occurs in the function port the control stem and lower flow slots are moved axially towards the vent seal assembly so the lower slots are proximate the vent seal assembly allowing fluid to flow from the function port to vent.

6. A regulator connected to a pressurized fluid supply and a downstream apparatus to regulate the pressure to the downstream apparatus and to vent excess pressure to atmosphere, the regulator comprising:

a body defining a vent port connected to atmosphere, a supply port connected to the pressurized fluid supply and a function port connected to a downstream apparatus;

an elongate control stem having a plurality of upper flow slots and a plurality of lower flow slots, the control stem moving axially in an axial bore in the body;

a supply seal assembly positioned in the body and encircling the control stem to selectively seal the body to the control stem;

a vent seal assembly positioned in the body and encircling the control stem to selectively seal the body to the control stem; and a sensor piston and spring operatively connected to the control stem to move the control stem axially from a neutral position to a open position and alternatively to a vent position and an adjustment knob positioned outside the body, the knob operatively connected to the control stem to adjust a set pressure of the regulator by axial movement of the upper flow slots and lower flow slots relative to the supply seal assembly and the vent seal assembly.

7. A regulator connected to a pressurized fluid supply and a downstream apparatus to regulate the pressure to the downstream apparatus and to vent excess pressure to atmosphere, the regulator comprising:

a body defining a vent port connected to atmosphere, a supply port connected to the pressurized fluid supply and a function port connected to a downstream apparatus;

an elongate control stem having a plurality of upper flow slots and a plurality of lower flow slots, the control stem moving axially in an axial bore in the body;

a supply seal assembly positioned in the body and encircling the control stem to selectively seal the body to the control stem;

a vent seal assembly positioned in the body and encircling the control stem to selectively seal the body to the control stem; and an adjustment knob positioned outside the body of the regulator, the knob operatively connected to the control stem to adjust the set pressure of the regulator and the knob operatively connected to spinning components so they can freely rotate without damage to the regulator when the knob is infinitely rotated clockwise or counter clockwise.

* * * * *